United States Patent
De Vittori et al.

(10) Patent No.: US 10,479,572 B2
(45) Date of Patent: Nov. 19, 2019

(54) BAND CLAMP

(71) Applicant: Oetiker Schweiz AG, Horgen (CH)

(72) Inventors: Nelson De Vittori, Richterswil (CH);
Robert Seelos, Rüschlikon (CH);
Manuel Müller, Alpthal (CH)

(73) Assignee: Oetiker Schweiz AG, Horgen (CH)

( * ) Notice: Subject to any disclaimer, the term of this patent is extended or adjusted under 35 U.S.C. 154(b) by 387 days.

(21) Appl. No.: 15/125,972

(22) PCT Filed: Nov. 27, 2014

(86) PCT No.: PCT/EP2014/075832
§ 371 (c)(1),
(2) Date: Sep. 14, 2016

(87) PCT Pub. No.: WO2016/029975
PCT Pub. Date: Mar. 3, 2016

(65) Prior Publication Data
US 2017/0259970 A1    Sep. 14, 2017

(30) Foreign Application Priority Data
Aug. 26, 2014  (WO) ............... PCT/EP2014/068046

(51) Int. Cl.
B65D 63/08    (2006.01)
F16L 33/02    (2006.01)
F16B 2/08     (2006.01)
B65D 63/06    (2006.01)
B60R 21/16    (2006.01)

(52) U.S. Cl.
CPC .............. B65D 63/08 (2013.01); B60R 21/16 (2013.01); B65D 63/06 (2013.01); F16B 2/08 (2013.01); F16L 33/021 (2013.01)

(58) Field of Classification Search
CPC .......... B65D 63/08; B65D 63/06; F16B 2/08;
B60R 21/16; F16L 33/021; Y10T
24/1467; Y10T 24/1463; Y10T 292/505
See application file for complete search history.

(56) References Cited

U.S. PATENT DOCUMENTS

| 1,517,515 A | 12/1924 | McGary |
| 2,118,158 A * | 5/1938 | Carlson ................. B65D 63/06 24/23 W |

(Continued)

FOREIGN PATENT DOCUMENTS

JP    2005187073 A    7/2005

OTHER PUBLICATIONS

U.S. Pat. No. 997,185, J.S. Fasting, Rotary Spiral Sieve. Application Filed Jan. 18, 1910, patented Jul. 4, 1911.

*Primary Examiner* — Robert Sandy
*Assistant Examiner* — Rowland Do
(74) *Attorney, Agent, or Firm* — Bond Schoeneck & King, PLLC; David Nocilly; George McGuire

(57) ABSTRACT

A low-profile clamp consists of a band (20) and a buckle (21) mounted on a first end portion of the band. During mounting, the second and portion (23) of the band (20) which surrounds the object to be fastened is fed through the buckle (21); after tightening the band is locked to the buckle (21) by deformation. The deformation may be done with a plier-type tool which engages the side edges (37) of the second band end portion (23) through lateral windows (36) formed in the buckle (21).

20 Claims, 7 Drawing Sheets

(56) References Cited

U.S. PATENT DOCUMENTS

| | | | | |
|---|---|---|---|---|
| 2,870,504 | A * | 1/1959 | Borbe | B65D 63/06 |
| | | | | 24/23 W |
| 3,117,812 | A * | 1/1964 | Brooks | B65D 77/185 |
| | | | | 292/311 |
| 3,172,692 | A * | 3/1965 | Brooks | B65D 77/185 |
| | | | | 292/311 |
| 3,641,629 | A | 2/1972 | Beardsley | |
| 3,754,303 | A | 8/1973 | Pollock | |
| 4,015,311 | A | 4/1977 | Curtis | |
| 4,080,082 | A * | 3/1978 | Angarola | B65B 13/345 |
| | | | | 140/93.2 |
| 4,192,043 | A * | 3/1980 | Konrad | B65B 13/345 |
| | | | | 24/21 |
| 4,501,356 | A * | 2/1985 | Urban | B65D 63/08 |
| | | | | 206/83.5 |
| 4,567,626 | A * | 2/1986 | Kimbrough | H01J 29/87 |
| | | | | 220/2.1 A |
| 4,866,817 | A * | 9/1989 | Espevik | B25B 25/005 |
| | | | | 24/23 W |
| 6,141,834 | A | 11/2000 | Lenox | |
| 7,373,695 | B2 | 5/2008 | Caveney et al. | |
| 7,810,359 | B2 * | 10/2010 | Hannula | A41D 20/00 |
| | | | | 2/181 |
| 10,065,776 | B2 * | 9/2018 | Prevot | B65D 63/08 |
| 2009/0241298 | A1 * | 10/2009 | Figiel | B65D 63/06 |
| | | | | 24/16 R |
| 2016/0363145 | A1 * | 12/2016 | De Vittorio | B65D 63/06 |

\* cited by examiner

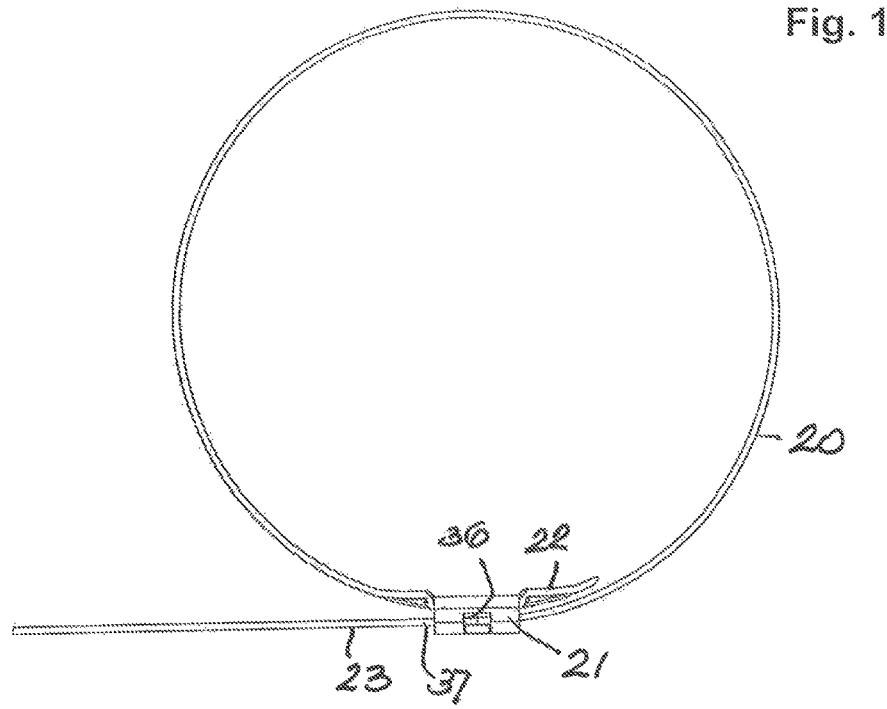
Fig. 1
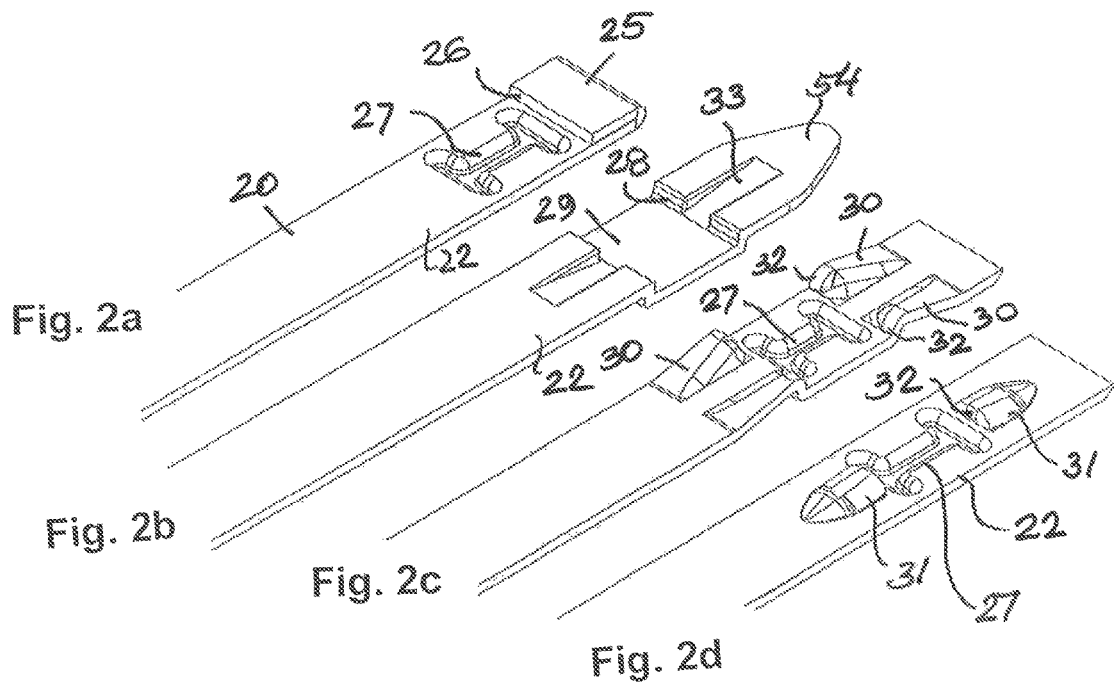
Fig. 2a
Fig. 2b
Fig. 2c
Fig. 2d

BAND CLAMP

PRIOR ART

For fastening an object such as an air bag material on a gas generator or an air bag on a mounting plate, low-profile clamps are used which consist of a band and a buckle disposed on one end portion of the band. During installation, the other end portion is wound around the object to be fastened and fed through the buckle. For tightening, the other band end is tensioned, and the band and the buckle are locked together in the tightened condition whereupon the excessive length of the outer band end is cut off.

In a low-profile clamp of this type, as known from U.S. Pat. No. 8,424,166 B2, the buckle, which surrounds both end portions of the band, has a hole in the outer side remote from the object to be fastened for receiving a punch by which the band end portions are deformed and thereby locked together.

Similar low-profile clamps are known from U.S. Pat. Nos. 3,754,303, 7,373,695 B2 and 7,650,680 B2, in which the buckle is initially fixed to one band end portion.

All these low-profile clamps involve the problem that the force which is applied to the punch for locking the band ends within the buckle acts on the object to be fastened and may damage the same. The object to be fastened is necessary as a counter element.

U.S. Pat. No. 5,483,998 discloses another low-profile clamp in which the buckle is locked to the band by lateral parts of the outer band end which are bent outward outside the buckle. This creates outward projecting edges outside the buckle.

SUMMARY OF THE INVENTION

The invention is based the object to avoid the mentioned difficulty at least in part. A more specific object may be seen in providing a low-profile clamp of the type initially described, which may be mounted with the force required for a secure fixation but without acting on the object to be fastened.

This object is met by the invention recited in claim 1. The low-profile clamp formed in accordance with claim 1 has a lateral window, preferably two opposite windows, so that the locking between the band and the buckle can be done by deforming the side edges of the band. By this deformation, the object to be fastened is neither influenced nor required even if relatively high deforming forces are applied to the low-profile clamp to achieve a secure locking. Since the locking is made in the area of the window, the band may terminate immediately behind the buckle.

Further advantages of the low-profile clamp according to the invention reside in that the buckle itself can be used as a cutting edge for severing the excessive band length. The cut is therefore at the buckle so that tolerances of the buckle and its window are taken up and the excessive band length is cut off flush with the buckle. Sharp outward edges are thus avoided.

Further, the locking is protected by the buckle against outer influences and remains visible. The fact that the width of the deformed part of the side edge of the band corresponds to the width of the window results in a locking which is practically free of play.

The locking is preferably achieved by a plier-like tool deforming the side edges of the outer band end portion.

The side edges of the inner band end portion may be chamfered or cut out at their sides facing the outer band end portion within an area of windows provided in the buckle, to avoid any interference on the tool.

The buckle is preferably made of a strip of material the ends of which extend toward one another and are interconnected by mutually engaging projections and recesses.

A particularly stable fixation of the buckle can be achieved by the inner band end portion having at least one transversely extending edge for abutting the buckle. The edge may be formed at a recess. Alternatively, the edge may be formed by a part of the inner band end portion being folded back, or by an embossment formed on the inner band end portion.

In a further embodiment of the invention, the inner band end portion may be tapered or bevelled to avoid steps between the inner band end portion and the object to be fastened, and to minimize friction.

The buckle may have an extension on the side facing the object to be fastened in order to achieve an improved seal with respect to the object to be fastened.

To improve the fixation of the buckle, the latter may have inner projections for engaging the side edges of the band.

In a further embodiment, the buckle may have an extension covering a cut edge which is generated on the outer band end portion when the excessive length is cut-off.

BRIEF DESCRIPTION OF THE DRAWINGS

Embodiments of the invention are described below with reference to the drawings in which:

FIG. 1 is a side view of a low-profile clamp in the closed, not yet tightened condition, not showing the object to be fastened;

FIGS. 2a to 2d are perspective representations of four alternative embodiments of the band end portion which is the inner one when the low-profile clamp is closed;

EMBODIMENTS

The low-profile clamp shown in FIG. 1 of the drawings includes a band 20 and a buckle 21. Both parts are preferably made of metal. The figure shows a condition in which the low-profile clamp is fixed to an inner band end portion 22, the band 20 surrounds an object to be fastened (not shown), and the outer band end portion 23 is fed through the buckle 21. In the final mounting, the band 20 is tightened around the object to be fastened by tension applied to the outer band end portion 23, the outer band end portion 23 is locked in the tightened condition by being deformed within the buckle 21, and the excessive length of band is cut off closely behind the buckle 21.

Figure 14:
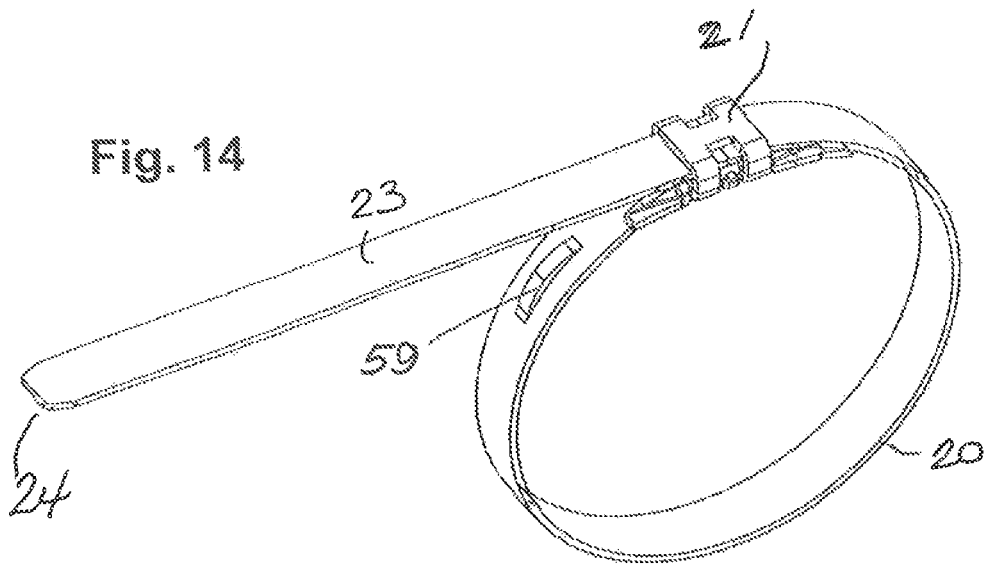
FIG. 14 shows a band clamp having an indicator.

To improve the handling in feeding the band 20 through the buckle and to reduce the risk of injury, the end 24 of the outer band end portion 23 may be rounded ore chamfered (see FIG. 14).

FIGS. 2a to 2d show formations of the inner band end portion 22 that are suitable for fixing within the buckle 21. In accordance with FIG. 2a, an end part 25 of the inner band end portion 22 is bent inward, in relation to the mounted condition, and forms a radially inward facing edge 26, as viewed from the end, for abutment against the corresponding end face of the buckle. The edge 26 serves to fix the buckle 21 on the band when the tension is applied to the outer band end portion 23.

In an area which in the mounted condition comes to be within the buckle 21, a bead 27 of, e.g., H-shaped configuration is stamped into the inner band end portion 22 to create a spacing from the outer band end portion 23.

In the embodiment of FIG. 2b, an edge 28 is formed at a trough-shaped recess 29 which has a size in the longitudinal direction of the band corresponding to the width of the buckle 21 so that it partly accommodates the latter.

In the alternative embodiments of FIGS. 2c and 2d, inward projections 30, 31 are embossed on the inner band end portion 22, the projections being spaced from one another in accordance with the width of the buckle 21. The projections 30, 31 again define a radially inward facing edge 32 as viewed from the end of the band. It is the embodiment of FIG. 2c which is assumed in the perspective view of FIG. 1.

Figure 3:
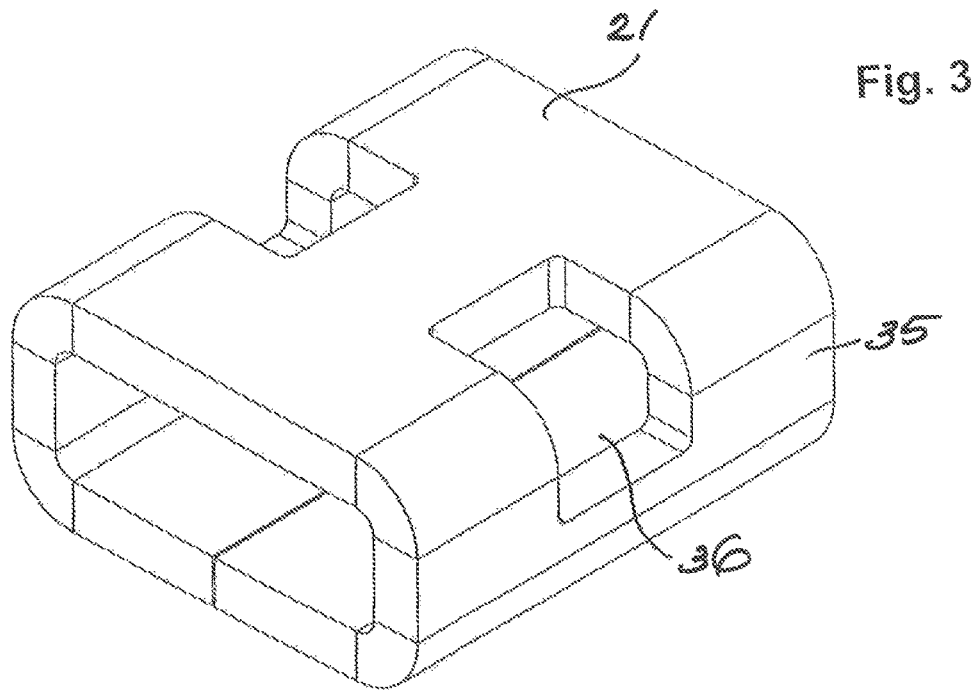
FIG. 3 is a perspective view of the buckle employed in the low-profile clamp of FIG. 1.
Figure 4:
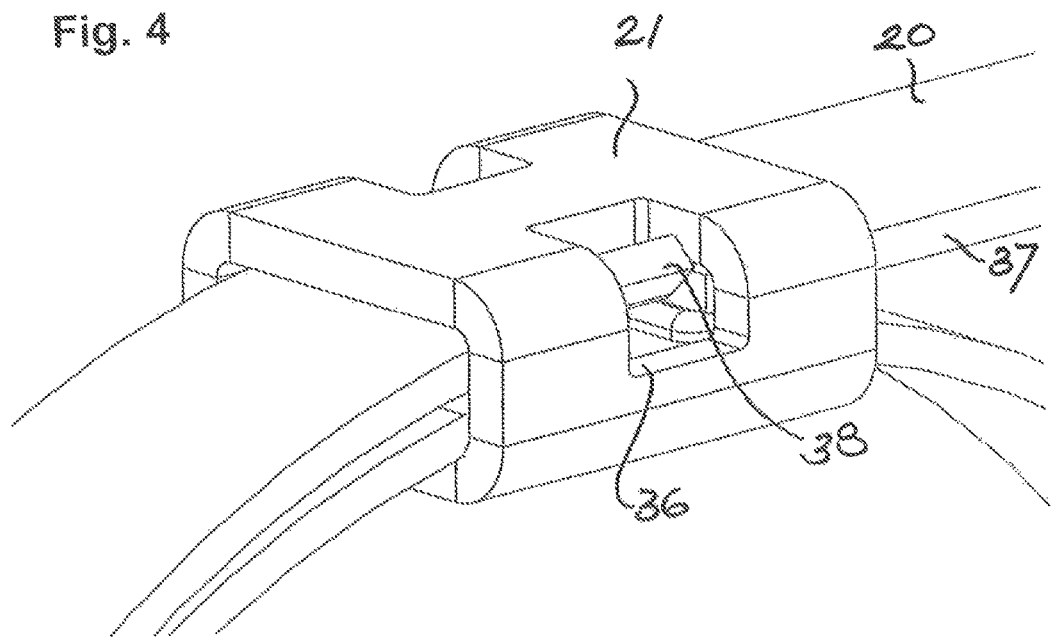
FIG. 4 shows the buckle of FIG. 3 locked to the outer band end portion.

As shown in FIGS. 3 and 4, the buckle is manufactured from a band of material into a loop surrounding both band end portions 22, 23. Windows 36 are formed in the side surfaces 35 of the buckle 21 at mutually opposite locations, through which windows a plier-type tool (not shown) can engage the side edges 37 of the outer band end portion 23 in order to deform the side edges upon tightening, thereby locking the buckle 21 with the band 20.

Figure 5:
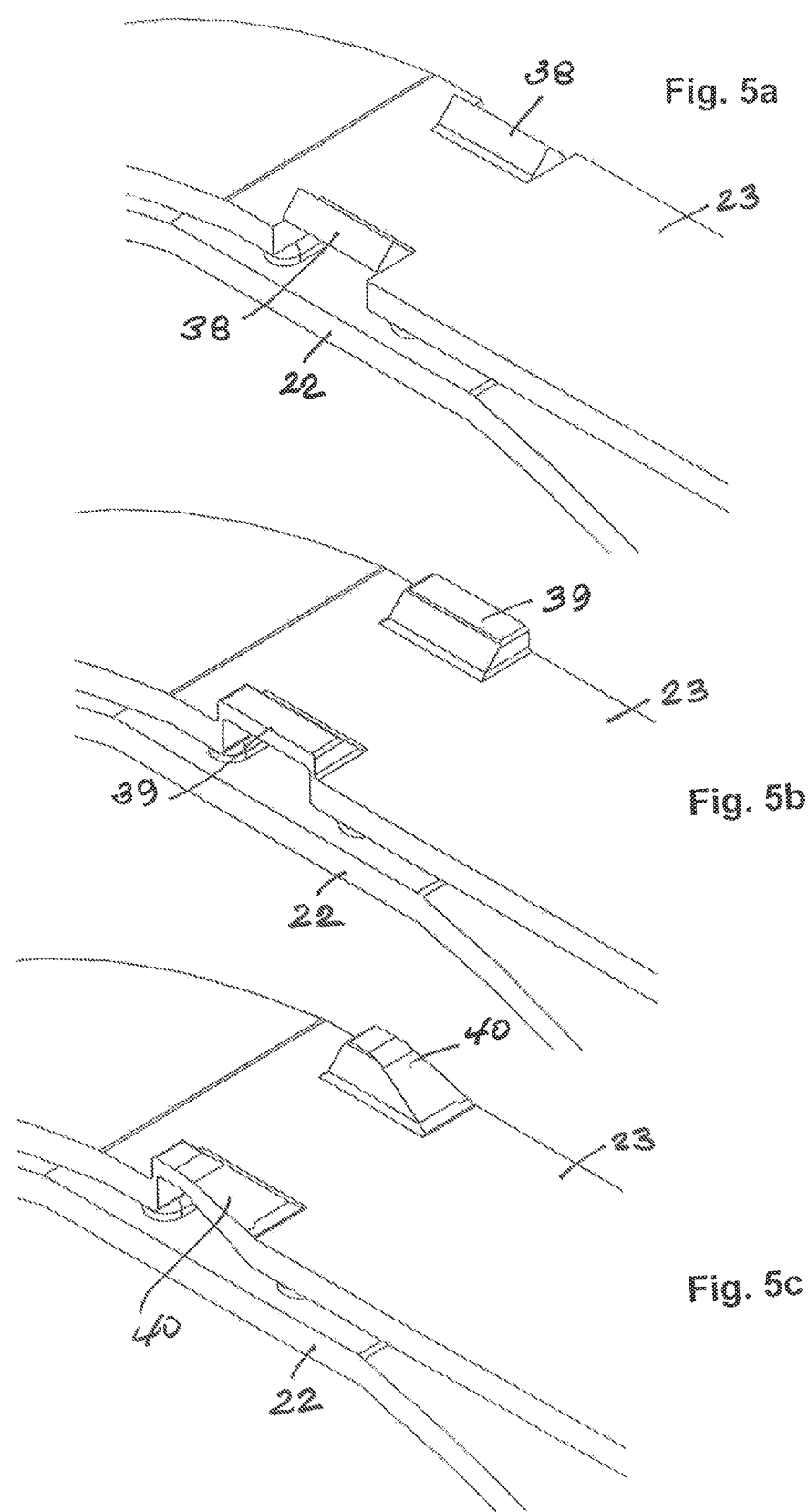
FIGS. 5a to 5c show different ways of locking the outer band end portion in the buckle.
Figure 6:
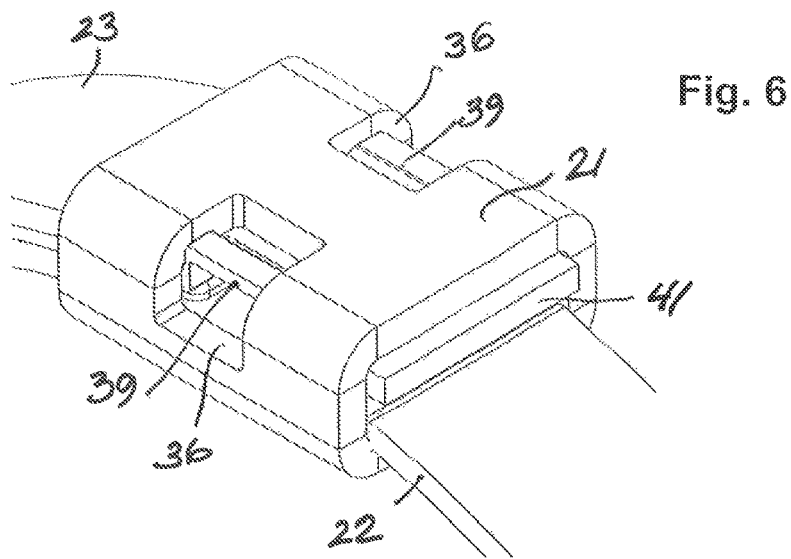
FIG. 6 shows a low-profile clamp with the buckle of FIG. 3 in the fully mounted condition without an object to be fastened.

In accordance with FIGS. 4 and 5, the deformation is done by cutting and outward bending those parts 38 of the side edges 37 of the outer band end portion 23 which exist within the area of the windows 36. Alternatively, the deformation may exist in embossments 39, 40 as shown in FIGS. 5b and 5c. FIG. 4 assumes the type of deformation shown in FIG. 5a. After the thus achieved locking, the excessive length of the band 20 is cut off at a position 41 closely behind the buckle 21, as shown in FIG. 6.

Figure 7:
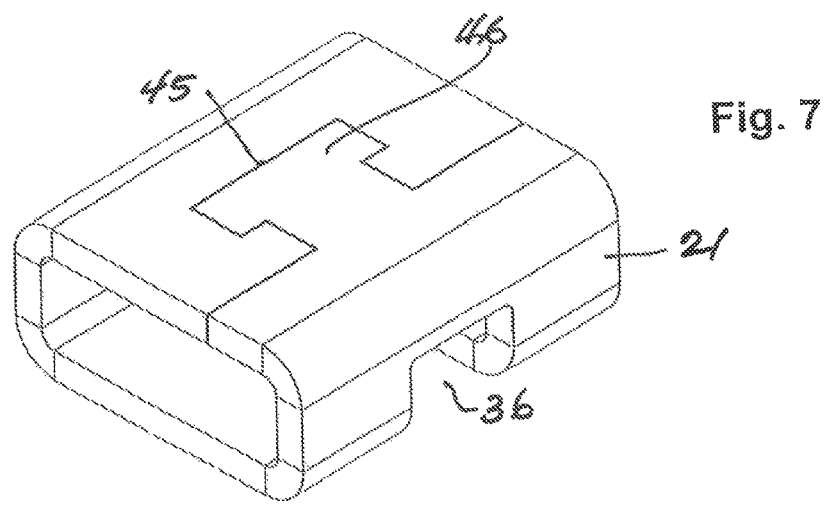
FIGS. 7 to 11 are modifications of the buckle.
Figure 8:
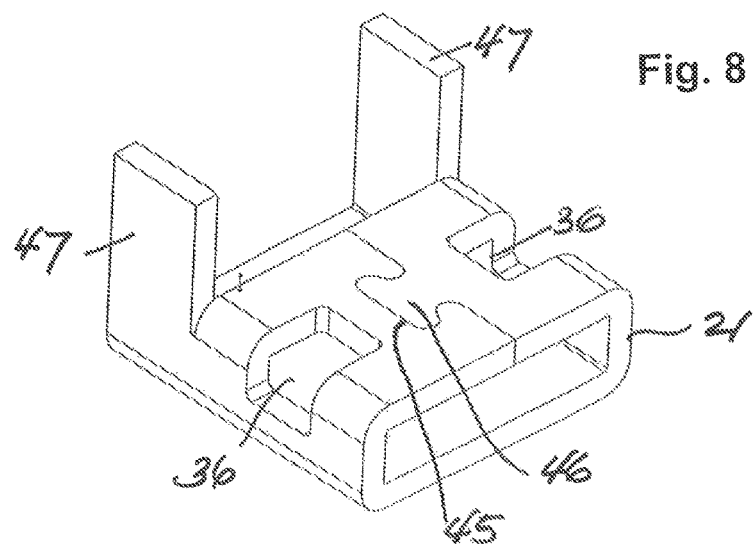

In accordance with FIGS. 7 and 8, the buckle 21 is formed from a strip of material bent into a loop the opposite ends of which are interconnected in a puzzle-like manner by mutually engaging cut-outs 45 and projections 46. In an alternative embodiment (not shown), the buckle may be made of feed stock.

In the embodiment shown in FIG. 8, parts 47 of the loop-shaped strip of material are notched and bent toward one another after tightening the band 20 and it locking within the buckle 21 in order to cover the cut edge 41 at the outer band end portion 23.

Figure 9:
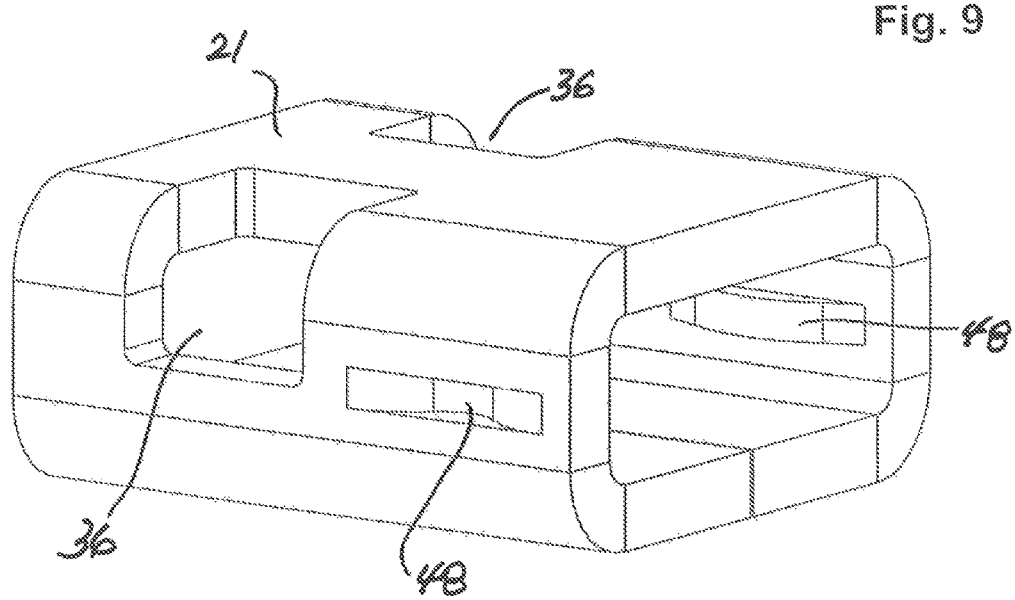

In accordance with FIG. 9, the lateral inner surfaces of the buckle 21 are formed with inner projections 48 which, during mounting, position the inner band end portion 22 in its height within the buckle 21. They also create a spacing with respect to the subsequently inserted outer band end portion 23, thereby facilitating the deformation of the latter during locking.

Figure 10:
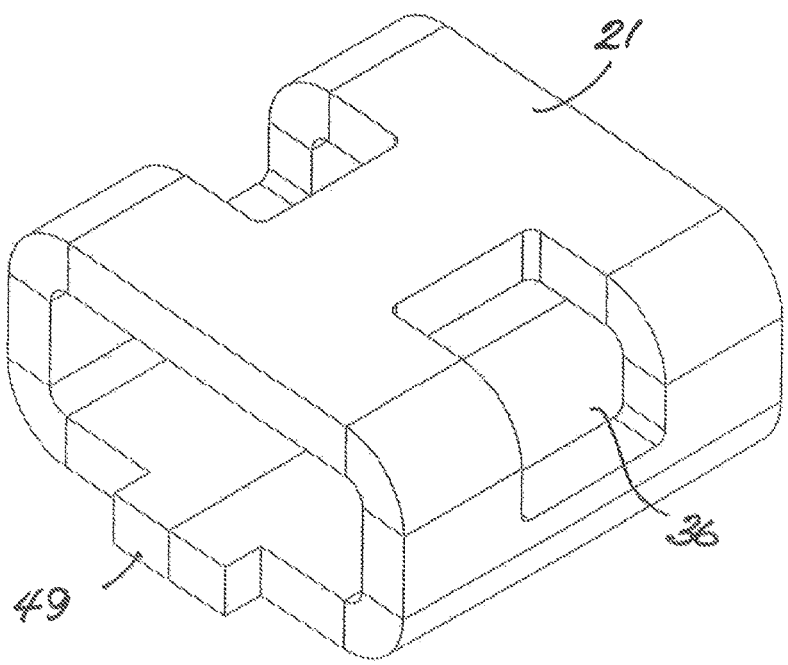

In the embodiment of FIG. 10, the buckle 21 is provided with end extensions 49 on the side facing the object to be fastened, which extensions are of advantage if the inner band end portion 22 has projections 30 as shown in FIG. 2c for fixing the buckle 21. In the fully mounted condition, the extensions 49 extend into the gap between the projections 30 to form an uninterrupted support for the object to be fastened. In the configuration shown in FIG. 2b, the same effect is achieved by the extensions 49 extending into the recesses 33.

Figure 11:
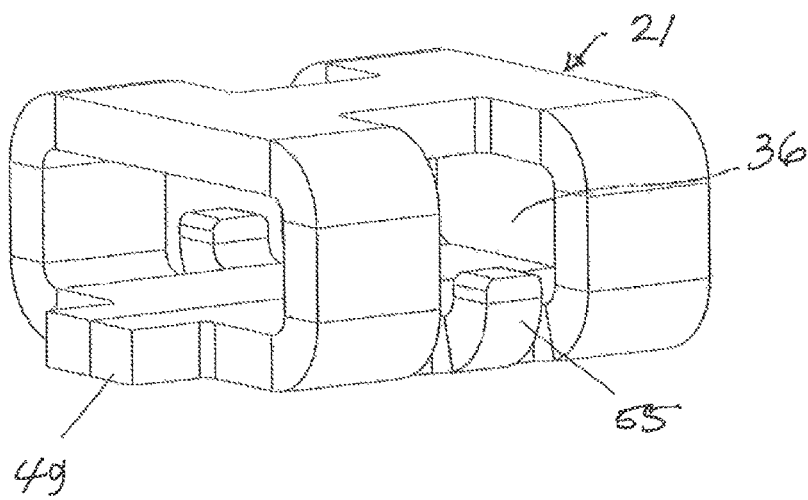

FIG. 11 shows the inner band end portion 22 similar to FIG. 2c but seen from its other side which is the outer side in the mounted condition. As shown, those parts 51 of side edges 50 of the inner band end portion 22 which come to lie within the window 26 have radially outward extending chamfers 52 which, similar to the bead 27 of FIGS. 2a, 2c and 2d, create a spacing from the outer band end portion 23 to make sure that only the latter is engaged by the deformation tool.

The buckle may be provided with one end extension 49 extending in the direction of the outer band end portion 23. Since the other end of the buckle is pressed flush by the force acting in the mounted condition, a stepless transition is guaranteed also at this end.

Figure 13:
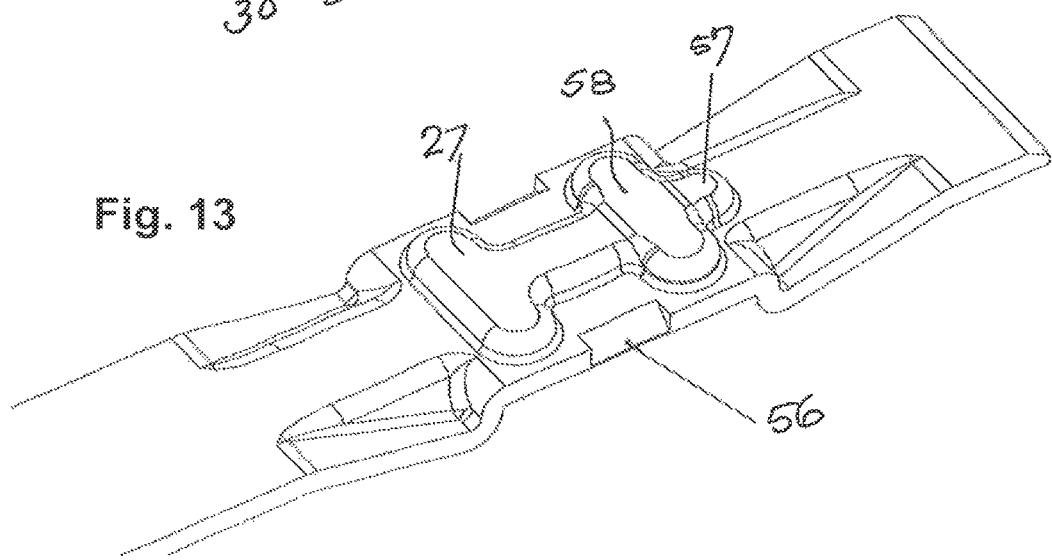

In the further embodiment illustrated in FIG. 11, the buckle has in either window 36 a chamber extension 55 for retaining the inner band end portion 22 at a respective lateral notch 56 (see FIG. 13).

Figure 12:
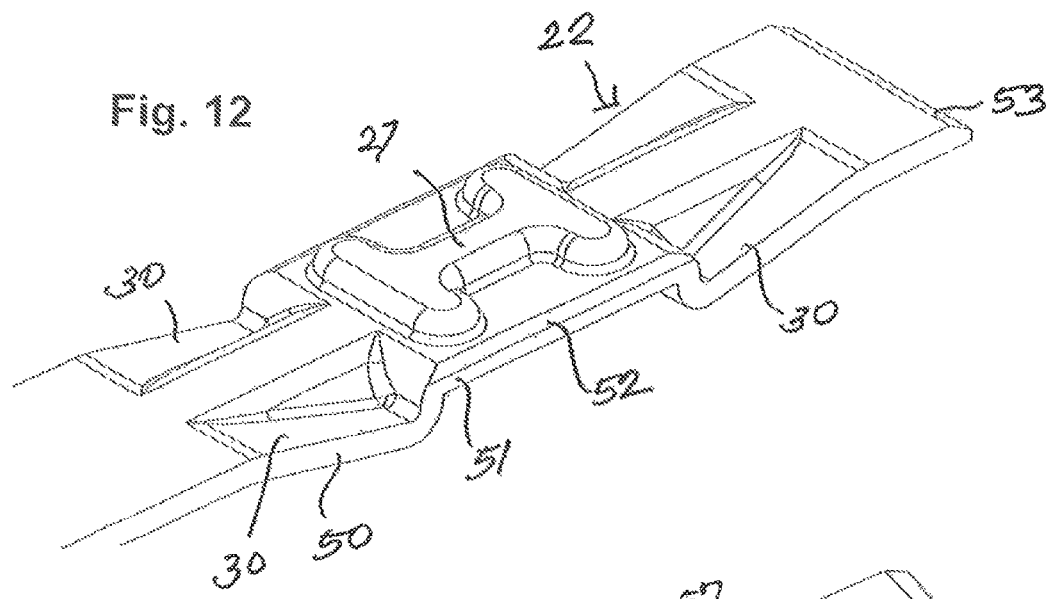
FIGS. 12 and 13 are modifications of the inner band end portion.

FIG. 12 shows the inner band end portion 22 similarly to FIG. 2c but seen from its other side which is the outer side in the mounted condition. As shown, the side edges 50 of the inner band end portion 22 are provided with radially outward chamfers 52 in the part 51 which come to lie within the window 36 of the buckle 21. Just as the bead 27 of FIGS. 2a, 2c and 2d the chamfers create a spacing from the outer band end portion 23 to make sure that the deforming tool engages only the latter.

As further shown in FIG. 12, the inner end portion 22 has its end bevelled at 53 to reduce the friction between the end portions 22, 23 during tightening and to equalize the force transition at the inner band end portion 22. The rounding 54 of the inner band end portion 22 shown in FIG. 2 serves the same purpose.

As shown in FIG. 13, the bead 27 may have an extension 57 extending in the direction of the inner band end portion 22 to improve the support of the buckle 21 by the band.

As further shown in FIG. 13, the transverse ridge 58 of the bead 27, which is situated in the direction of the inner band end portion 22 may be raised for optimal locking.

The clamp may be provided with a visible indicator 59 to determine whether a certain minimal force has been applied during installation. In the embodiment of FIG. 14 the indicator consists of a member which is deformed by a given band tension, e.g. is drawn toward the band and contacts the same partly or completely.

Figure 15:
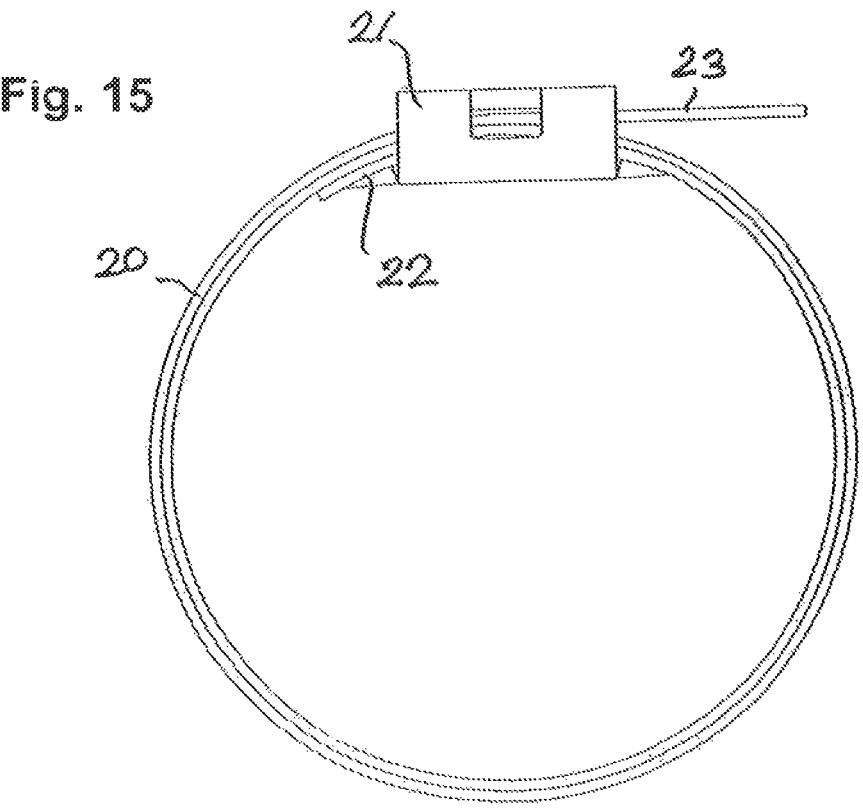
FIG. 15 shows a low-profile clamp in which the band is fed through the buckle a plurality of times.

As shown in FIG. 15, the band 20 may be fed twice or even several times through the buckle 21 to achieve higher strength.

REFERENCE NUMERALS

20 Band
21 Buckle
22 Inner band end portion
23 Outer band end portion
25 End part
26 Edge
27 Bead
28 Edge
29 Recess 30 Projection
31 Projection
32 Edge
33 Recess
35 Side surface
36 Window
37 Side edge
38 Part of the side edge 37
39 Embossment
40 Embossment
41 Cutting position
45 Cut-out
46 Projection
47 Notched part
48 Inward projection
49 Extension
50 Side edge
51 Part of the side edge 50
52 Chamfer
53 Bevel
54 Rounding
55 Chamber extension
56 Notch
57 Extension
58 Transverse ridge
59 Indicator

The invention claimed is:

1. A low-profile clamp having a band (20) and a buckle (21) surrounding the band and being provided on a first end portion (22) of the band, wherein the second end portion (23) of the band, which surrounds the object to be fastened and is fed through the buckle (21) radially outside of the first end portion (22), is adapted to be locked with the buckle (21) by deformation,
wherein a lateral surface of the buckle (21) has a window (36) exposing a side edge (37) of the band within the window (56) to permit locking to be performed by deforming the side edge (37) of the band (20) within the window (36), and
wherein the first band end portion (22) is held at a spacing from the second band end portion (23) within the buckle (21) to permit locking by means of a plier-type tool deforming the side edge (37) of the second band end portion (23) only.

2. The low-profile clamp of claim 1, wherein the window (36) is configured to form a cutting edge for deforming the band (20).

3. The low-profile clamp of claim 1, wherein two lateral surfaces of the buckle (12) have windows (36) arranged opposite to each other to permit the locking to be performed by simultaneously deforming both side edges (37) of the band (20).

4. The low-profile clamp of claim 3, wherein side edges (50) of the first band end portion (22) are chamfered (52) or cut-out at their sides facing the second band portion (23) within the area of the windows (36) provided in the buckle (21).

5. The low-profile clamp of claim 1, wherein the first band end portion (22) is provided with a bead (27) to keep a spacing from the second band end portion.

6. The low-profile clamp of claim 5, wherein the bead (27) has an extension (57) in the direction of the first band end portion (22).

7. The low-profile clamp of claim 5, wherein a part (58) of the bead (27) that is situated in the direction of the first band end portion (22) is raised.

8. The low-profile clamp of claim 1, wherein the buckle (21) is made of a bent strip of material having ends extending toward each other and being interconnected by mutually engaging cut-outs (45) and projections (46).

9. The low-profile clamp of claim 1, wherein the buckle (21) has in each window (36) a chamber extension (55) for retaining the first band end portion (22) at a respective lateral notch (56).

10. The low-profile clamp of claim 1, wherein the first band end portion has at least one transverse edge (26; 28; 32) for abutting at the buckle (21).

11. The low-profile clamp of claim 10, wherein the edge (28) is formed at a first recess (29) which has a size in the longitudinal direction of the band corresponding to the width of the buckle (21).

12. The low-profile clamp of claim 10, wherein the edge (26) is formed by a folded part (25) of the first band end portion (22).

13. The low-profile clamp of claim 10, wherein the edge (32) is formed by a projection (30) stamped in the first band end portion (22).

14. The low-profile clamp of claim 1 having an indicator (59) for indicating the band tension.

15. The low-profile clamp of claim 1, wherein the first band end portion (22) is tapered (54).

16. The low-profile clamp claim 1, wherein the first band end portion (22) is beveled (53).

17. The low-profile clamp of claim 1, wherein the buckle (21) has an extension (49) at the side facing the object to be fastened.

18. The low-profile clamp of claim 1, wherein the buckle (21) has inner projections (48) for abutting the side edges (37) of the band (20).

19. The low-profile clamp of claim 1, wherein the buckle (21) is configured to be used for a cutting edge for severing excessive length of the second band end portion (23).

20. The low-profile clamp of claim 1, wherein the buckle (21) has a notched part (47) for covering a cut edge (41) of the second band end portion (23).

* * * * *